United States Patent Office 3,346,555
Patented Oct. 10, 1967

3,346,555
ADDUCTS OF POLYGALACTOMANNAN GUMS AND PROCESS FOR PREPARING SAME
Robert Nordgren, Minneapolis, Minn., assignor to General Mills, Inc., a corporation of Delaware
No Drawing. Filed June 1, 1965, Ser. No. 460,496
5 Claims. (Cl. 260—209)

This invention relates to derivatives of polygalactomannans and to the process of preparing same. More pariculariy, it relates to acrylamide adducts of polygalactomannan gums and the process of preparing said adducts.

It is therefore an object of this invention to provide novel acrylamide adducts of polygalactomannans.

Another object of the invention is to provide a process for preparing said novel compositions of matter.

These and other objects will become apparent from the following detailed description.

The adducts of the present invention are prepared by reacting acrylamide with any of a variety of unmodified polygalactomannans. The polygalactomannans are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1–4 β-glycosidic linkage and the galactose branching takes place by means of a 1–6 linkage on alternate mannose units. The ratio of galactose to mannose in the guar polymer is, therefore, one to two. Locust bean gum is also a polygalactomannan gum of similar molecular structure in which the ratio of galactose to mannose is one to four. Guar and locust bean gum are the preferred sources of the polygalactomannans, principally because of the commercial availability thereof.

The proportions of the reactants can vary over a relatively wide range. Preferably, 0.2 to 1.0 equivalent of acrylamide are used for each equivalent of anhydrous hexose unit in the polygalactomannan. Larger or smaller amounts, however, can be used, i.e., from about 0.1 to 3.0 equivalents of acrylamide. Useful products are provided having a degree of substitution (D.S.) of from about 0.1 to 3.0, the most preferred products having a D.S. of 0.1 to 1.0.

The reaction can be conducted at atmospheric pressure and at relatively moderate temperatures, such as from about 25 to 100° C. At low temperatures (i.e., 25° C.), the reaction proceeds very slowly. At high temperatures (i.e., 75–100° C.) the reaction proceeds quite rapidly. A preferred reaction temperature is from about 30 to 90° C. Pressures of up to 30 p.s.i. or more can be used.

The reaction is preferably conducted in the presence of an alkaline catalyst and water and/or fluidizing solvents. The amounts of water and/or solvent can vary over relatively wide limits. Thus enough water to swell, but not to solubilize, the polygalactomannan can be used. Amounts of about 10 to 90% by weight based on the total weight of the reaction mixture give especially good results.

If a solvent is used, it should be inert. Examples of suitable solvents are secondary and tertiary alcohols, such as isopropanol and tertiary butyl alcohol. Said solvent should be used in an amount sufficient to aid in the fluidization of the reactants and thus to facilitate the reaction. Again, the amount thereof can vary widely but will generally be within the range of about 10 to 90% by weight based on the total weight of the reaction mixture. It is also understood that both water and the solvent can be used at the same time.

A catalyst is preferably used to increase the rate of reaction. Suitable catalysts are basic catalysts, such as the alkali metal or alkaline earth metal hydroxides such as sodium hydroxide, potassium hydroxide, and calcium hydroxide, or ammonium hydroxide and benzyl trimethyl ammonium hydroxide. The concentration of the catalyst is not critical. However, when employed it is preferred to use the catalyst in amounts of about 0.05 to 1 percent by weight based on the weight of the total reaction mixture.

There is nothing critical in the sequence in which the reactants, catalyst, water and/or solvent are admixed. Thus, for example, the catalyst can be added to the polygalactomannan with or without water and/or solvent, followed by addition of the acrylamide.

The adducts of the present invention disperse in cold water at a faster rate than the original unmodified gum product to produce sols of greater clarity. These sols are useful for flocculation of slimes of bentonite and kaolin. They are particularly useful as textile "print gums." "Print gums" must be stable at pH values of 12. Regular unmodified guar gum sols are not stable at this pH but sols made from the acrylamide adducts of guar are very stable. Solutions containing 0.2% of NaOH have retained their viscosity for several weeks.

The following specific examples are furnished for the purpose of illustration only and are not to be construed as placing any limitations on the scope of the present invention.

Example I

Into a one liter reaction vessel fitted with a stirrer, thermometer and water-cooled condenser were added the following reactants:

(1) Tertiary butanol _____grams__ 200
(2) Guar flour (0.25 equivalent) _____do____ 50
(3) Water _____do____ 300
(4) Acrylamide (0.74 equivalent) _____do____ 50
(5) Trimethyl benzyl ammonium hydroxide (40% solution in methanol) _____mls__ 10

This mixture was stirred and heated at 86° C. for 8 hours and then filtered. The filter cake was a slightly swollen (yellow) cake of guar flour. This was suspended in methanol and again filtered. This time the filter cake was composed of unswollen granules of almost white guar flour. The product was dried in a vacuum drier to remove the methanol.

Dried weight _____grams__ 48
Water _____percent__ 1.7
Nitrogen _____do____ 2.86

Another sample of guar treated in a like manner without the addition of acrylamide, had a nitrogen content of 0.53%. Since the added nitrogen came from the acrylamide, it was calculated that the D.S. (degree of substitution) was 0.33. This means that for every 3 sugar units, one acrylamide molecule reacted to form an adduct.

Example II

Into an identical reatcion vessel described in Example I were added the following reactants:

(1) Isopropanol _____grams__ 200
(2) Guar flour (0.25 equivalent) _____do____ 50
(3) Water _____do____ 350
(4) Acrylamide (1.06 equivalents) _____do____ 71
(5) Trimethyl benzyl ammonium hydroxide (40% solution in methanol) _____mls__ 10

This mixture was stirred and heated at 75° C. for 22 hours and then filtered, washed and dried as described in Example I.

| | | |
|---|---|---|
| Yield | grams | 50 |
| Water | percent | 8.3 |
| Nitrogen | do | 1.37 |
| D.S. | | 0.12 |

*Example III*

Into a reaction vessel identical to that described in Example I were added the following reactants:

| | Grams |
|---|---|
| (1) Tertiary butanol | 100 |
| (2) Guar flour (0.25 equivalent) | 50 |
| (3) Water | 250 |
| (4) Acrylamide (0.74 equivalent) | 50 |
| (5) Sodium hydroxide | 1 |

This mixture was stirred and heated for 5.5 hours at 87° C. and then filtered, washed and dried as described in Example I.

| | | |
|---|---|---|
| Yield | grams | 54 |
| Water | percent | 9.4 |
| Nitrogen | do | 2.5 |
| D.S. | | 0.29 |

It is to be understood that the invention is not to be limited to the exact details of operation or the compositions and methods shown and described, as obvious modificatons will be apparent to those skilled in the art and the invention is to be limited only by the scope of the appended claims.

The embodiments of the invention in which an exclusive property or privilege is claimed are defined as follows:

1. An acrylamide adduct of a polygalactomannan.
2. The acrylamide adduct of guar gum.
3. The acrylamide adduct of locust bean gum.
4. An acrylamide adduct as defined in claim 1 having a degree of substitution of from 0.1 to 3.0.
5. An acrylamide adduct as defined in claim 1 having a degree of substitution of from 0.1 to 1.0.

References Cited

UNITED STATES PATENTS

| 3,098,869 | 7/1963 | Borchert | 260—209 |
| 3,100,203 | 8/1963 | Borchert | 260—209 |

OTHER REFERENCES

Pigman: "The Carbohydrates," 1957, Academic Press, Inc., New York, N.Y., pages 695–696.

LEWIS GOTTS, *Primary Examiner.*

J. R. BROWN, *Assistant Examiner.*